United States Patent
Hagen et al.

(10) Patent No.: US 8,787,853 B2
(45) Date of Patent: Jul. 22, 2014

(54) RECEIVER SYSTEM COMPRISING A MAIN RECEIVER AND AU AUXILIARY RECEIVER FOR CORRECTING IMPERFECTIONS IN THE MAIN RECEIVER

(75) Inventors: Derek Hagen, Ytterby (SE); Vimar Bjork, Gothenburg (SE); Claes Rolen, Uddevalla (SE); Torbjorn Gunnar Widhe, Askim (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 0 days.

(21) Appl. No.: 13/977,590

(22) PCT Filed: Dec. 29, 2010

(86) PCT No.: PCT/EP2010/070881
§ 371 (c)(1),
(2), (4) Date: Jun. 28, 2013

(87) PCT Pub. No.: WO2012/089255
PCT Pub. Date: Jul. 5, 2012

(65) Prior Publication Data
US 2013/0288623 A1    Oct. 31, 2013

(51) Int. Cl.
H04B 7/08    (2006.01)
H04B 1/10    (2006.01)

(52) U.S. Cl.
USPC ............ 455/132; 455/303; 455/334; 375/349

(58) Field of Classification Search
CPC ............ H04B 1/04; H04B 1/40; H04B 1/126; H04B 1/0475; H04B 7/0885
USPC .......... 455/132, 295, 296, 303, 334; 375/346, 375/349

See application file for complete search history.

(56) References Cited

U.S. PATENT DOCUMENTS

| | | | |
|---|---|---|---|
| 6,088,581 A * | 7/2000 | Bickley et al. | 455/303 |
| 6,662,367 B2 * | 12/2003 | Dapper et al. | 375/346 |
| 6,731,704 B1 * | 5/2004 | Kiyanagi | 375/346 |
| 7,787,841 B2 * | 8/2010 | Tsukio et al. | 455/132 |
| 2003/0122534 A1 | 7/2003 | Seppinen et al. | |
| 2009/0086864 A1 | 4/2009 | Komninakis et al. | |
| 2009/0186582 A1 | 7/2009 | Muhammad et al. | |

* cited by examiner

*Primary Examiner* — Quochien B Vuong
(74) *Attorney, Agent, or Firm* — Rothwell, Figg, Ernst & Manbeck, P.C.

(57) ABSTRACT

A receiver circuit comprising first and second receivers for demodulating first and second parts, respectively, of a received signal. The receiver circuit also comprises an adjustment circuit for adjusting the demodulated signal from the first receiver. The output signal from the adjustment circuit is used as output signal from the receiver circuit which also comprises an adjustment value circuit for determining an adjustment value for the adjustment circuit in adjusting the output signal from the first receiver. The adjustment value circuit receives the demodulated signal from the second receiver and the output signal from the adjustment circuit and uses differences between these input signals for forming said adjustment value. The first receiver and the second receiver have different transfer functions within one and the same frequency range.

9 Claims, 5 Drawing Sheets

RECEIVER SYSTEM COMPRISING A MAIN RECEIVER AND AU AUXILIARY RECEIVER FOR CORRECTING IMPERFECTIONS IN THE MAIN RECEIVER

CROSS REFERENCE TO RELATED APPLICATION(S)

This application is a 35 U.S.C. §371 National Phase Entry Application from PCT/EP2010/070881, filed Dec. 29, 2010, designating the United States, the disclosure of which is incorporated herein in its entirety by reference.

TECHNICAL FIELD

The present invention discloses a receiver system with reduced receiver imperfections.

BACKGROUND

Receivers for communications systems today are built using one of a variety of possible receiver principles, where the choice of principle is determined by such factors as cost, power consumption and performance requirements. Each receiver principle has its merits, benefits and drawbacks. In order to counteract the drawbacks of a particular chosen principle, a receiver is usually over-dimensioned in order to fulfill the performance requirements, which is then done at the cost of power consumption and component expense.

In addition to this, demands on receivers with high bandwidth as well as high selectivity push receiver designers to use receiver principles or topologies which exhibit imperfections that need to be handled or compensated, usually by means of extensive signal processing.

SUMMARY

As has emerged from the above, there is a need for a receiver which can meet high performance demands, while requiring as little processing as possible in order to handle any possible receiver imperfections, caused by, for example, a certain choice or receiver principle.

This need is address by the present invention in that it discloses a receiver circuit which comprises a first and a second receiver which are arranged to receive and demodulate a first and a second part, respectively, of a received signal.

In addition, the receiver circuit also comprises an adjustment circuit for adjusting the demodulated output signal from the first receiver, and the output signal from the adjustment circuit is also used as output signal from the receiver circuit as such.

Furthermore, the receiver circuit comprises an adjustment value circuit for determining an adjustment value for use by the adjustment circuit in adjusting the output signal from the first receiver. The adjustment value circuit is arranged to receive as input signals the demodulated signal from the second receiver and the output signal from the adjustment circuit, and is also arranged to use differences between these input signals for forming the adjustment value.

In the receiver circuit, the first and the second receivers have different transfer functions within one and the same frequency range.

Due to the fact that the two receivers in the receiver circuit have different transfer functions within one and the same frequency range and are arranged to receive and demodulate a first and a second part, respectively, of a received signal, one of the receivers can be used as a "main receiver" of the receiver circuit and the other receiver can be used as an "observation receiver" which detects imperfections in the "main receiver". As will be seen in the detailed description in the following text, the two receivers can be given their different transfer functions in a number of ways. One example is that the first and second receivers have different transfer functions within one and the same frequency range in that the first receiver has a linear transfer function in an interval from a first lower frequency to a first upper frequency, and the second receiver has a linear transfer function in an interval from a second lower frequency to a second upper frequency, whereat least one of the first lower frequency and the first upper frequency is smaller or larger than the second lower frequency and the second upper frequency, respectively.

Another example is that the first and second receivers have different transfer functions within one and the same frequency range by virtue of the fact that the first receiver is a super heterodyne receiver and the second receiver is a homodyne receiver, i.e. the first and the second receivers use different receiver principles which have different imperfections.

In one embodiment, the receiver circuit comprises a splitter for splitting a received signal into the first and second parts, i.e. the parts for use by the first and the second receiver.

In one embodiment, the adjustment value from the adjustment value circuit comprises a polynomial which the adjustment circuit is arranged to apply to the demodulated signal from the first receiver.

BRIEF DESCRIPTION OF THE DRAWINGS

The invention will be described in more detail in the following, with reference to the appended drawings, in which.

DETAILED DESCRIPTION

Figure 1:
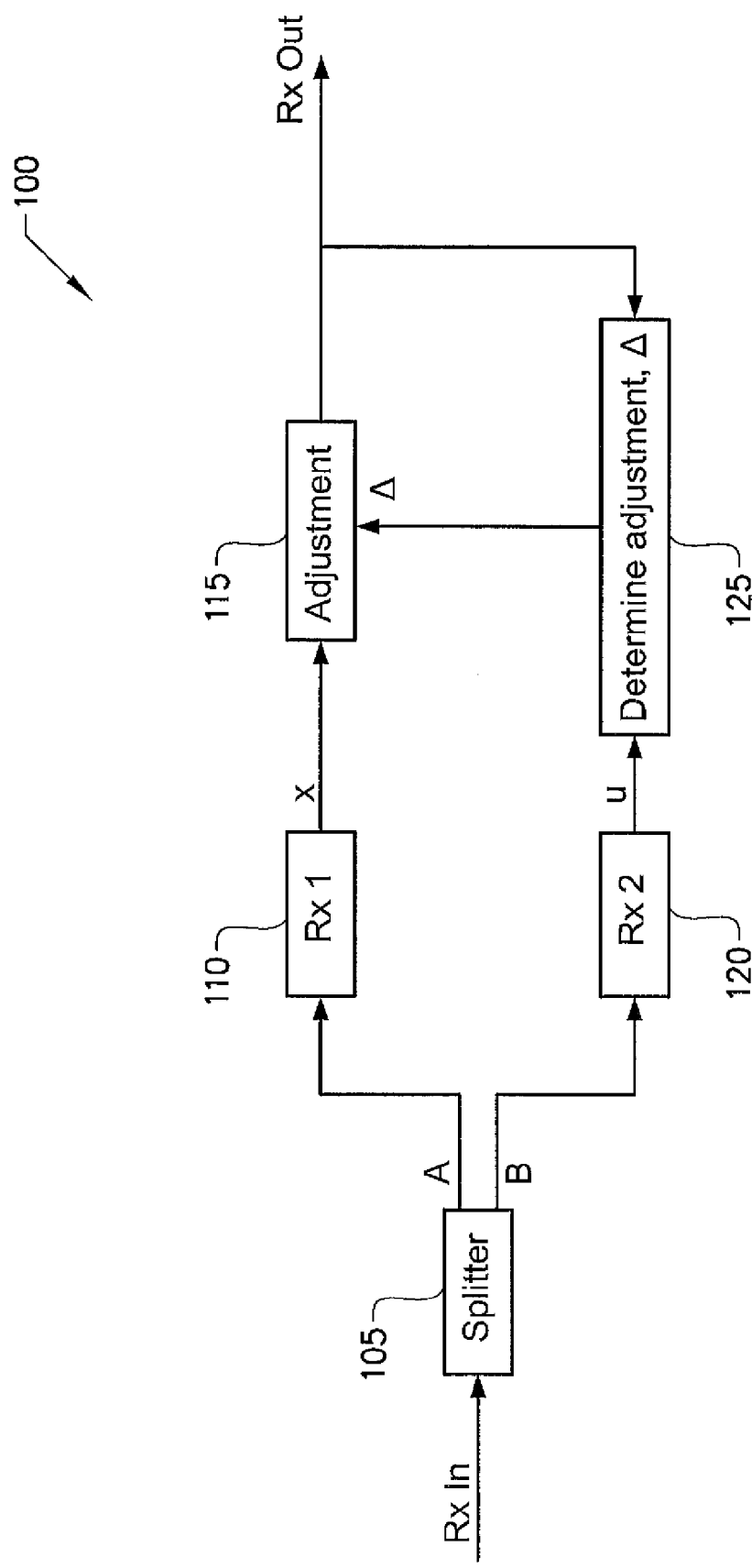
FIG. 1 shows a block diagram which illustrates a principle used by the invention.

Embodiments of the present invention will be described more fully hereinafter with reference to the accompanying drawings, in which embodiments of the invention are shown. The invention may, however, be embodied in many different forms and should not be construed as being limited to the embodiments set forth herein. Like numbers in the drawings refer to like elements throughout.

The terminology used herein is for the purpose of describing particular embodiments only, and is not intended to limit the invention.

FIG. 1 shows a schematic block diagram of an embodiment of a receiver circuit 100 of the invention. As shown in FIG. 1, the receiver circuit 100 is arranged to receive an incoming signal, "Rx In", and comprises a splitter 105 for splitting the received signal into a first and a second part, shown as A and B in FIG. 1. Suitably although not necessarily, the split is 50%, i.e. the first and second parts of the incoming signal are equally large. The first and second parts A and B of the received signal are received and demodulated by respective first and second receivers 110, 120.

In the example shown in FIG. 1, one of the receivers, in this case the first receiver 110, is used as the "main" receiver of the receiver circuit 100, and the other receiver, i.e. the second receiver 120, is used as an "observation" or "correction"

receiver, which is used to detect imperfections in the transfer function of the main receiver 110, so that such imperfections can be compensated for. The terms "first receiver" and "main receiver" will from now on be used as synonyms for each other, as will the terms "second receiver" and "observation receiver".

In order for the observation receiver 120 to be able to detect imperfections in the transfer function of the main receiver 110, the main receiver 110 and the observation receiver 120 are chosen so that they have different transfer functions within one and the same frequency range. This concept will be explained in more detail in the following, but a brief initial explanation is as follows: if the operational range of the receiver circuit 100 is from frequency $f_1$ to frequency $f_2$, and it is known that the main receiver 110 exhibits a good transfer function within a sub-range of this range, for example between frequencies $f_1$ and $f_1'$, where $f_2 > f_1' > f_1$, the observation receiver should be chosen from a group of receivers which is known to have a good transfer function at least within the frequency interval $f_1'$ to $f_2$, i.e. within the frequency interval where the main receiver is known to have "flaws" in its transfer function.

The embodiment 100 shown in FIG. 1 also comprises an adjustment circuit 115, which is arranged to receive and adjust the demodulated output signal from the main receiver 110. The adjustments are made by means of an adjustment value $\Delta$ which is received from an adjustment value circuit 125. As can be seen in FIG. 1, the output signal from the adjustment circuit 115 is also used as the output signal $Rx_{OUT}$ from the entire receiver circuit 100.

The adjustment value circuit 125 is arranged to receive two input signals, the output signal from the adjustment circuit 115, i.e. the output signal $Rx_{OUT}$ from the entire receiver circuit 100, and the demodulated output signal from the observation receiver 120. Using these two input signals, the adjustment value circuit is arranged to determine the adjustment value $\Delta$ which is used as one of two input signals to the adjustment circuit 115.

As mentioned, the main receiver 110 and the observation receiver 120 shown in FIG. 1 have different transfer functions within one and the same frequency range. This concept will now be illustrated with reference to FIG. 2, which shows an example of different transfer functions of the main receiver 110 and the observation receiver 120. It should be pointed out that the different transfer functions shown in FIG. 2 are merely examples intended to illustrate a concept—in principle any two receivers with different transfer functions can be used within the framework of the invention.

Figure 2:
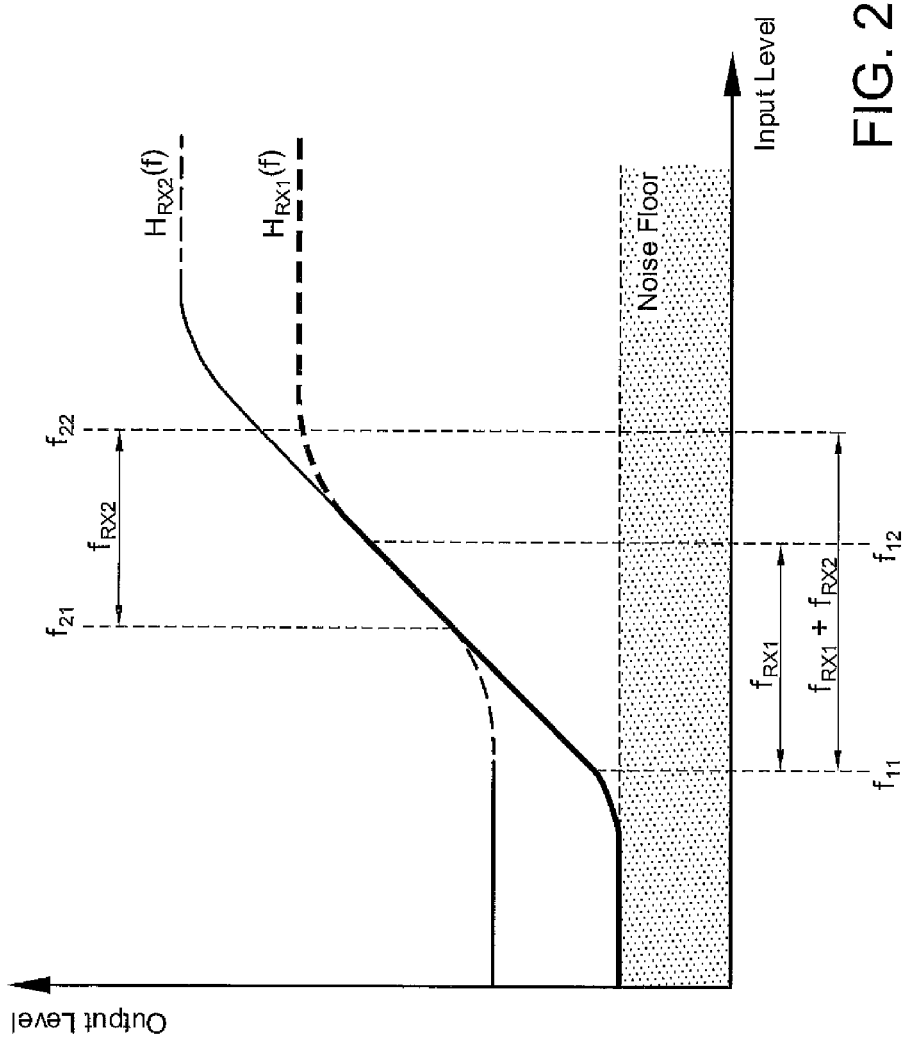
FIG. 2 shows an example of different transfer functions of two receivers.

In FIG. 2, the transfer function of the main receiver 110 is labeled as $H_{RX1}(f)$ and that of the observation receiver 120 is labeled as $H_{RX2}(f)$. As shown in FIG. 2, $H_{RX1}(f)$ is linear within the frequency range indicated as $f_{RX1}$, i.e. from $f_{11}$ to $f_{12}$, and $H_{RX2}(f)$ is linear within the frequency range indicated as $f_{Rx2}$, i.e. $f_{21}$ to $f_{22}$. Thus, in order to obtain a receiver circuit which has a linear transfer function within the entire frequency range indicated as $f_{RX1+RX2}$ in FIG. 2, the two receivers can be used in the manner shown in FIG. 1 and explained in connection to that figure. In other words, the main receiver 110 which has a linear transfer function within the frequency range $f_{RX1}$ is "aided" by the "observation" receiver 120 which has a linear transfer function within the frequency range $f_{RX2}$, so that a receiver circuit which has a linear transfer function within the frequency range $f_{RX1+RX2}$ is obtained.

In the example of FIG. 2, the linear range $f_{rx2}$ of the observation receiver 120 starts at a higher frequency than the linear range $f_{rx1}$ of the main receiver 110, and also ends at a higher frequency than the linear range $f_{rx1}$ of the main receiver 110.

Naturally, the opposite can also be the case, i.e. that the linear range of the observation receiver 120 starts at a lower frequency than the linear range $f_{rx1}$ of the main receiver 110, and also ends at a lower frequency than the linear range $f_{rx1}$ of the main receiver 110.

In addition to the example of different transfer functions shown in FIG. 2, it should also be pointed out that the differences between the two transfer functions need not be that they are linear within different frequency ranges, the differences between the transfer functions can be entirely other differences, such as, for example, desired non-linear properties within different frequency ranges.

Figure 3:
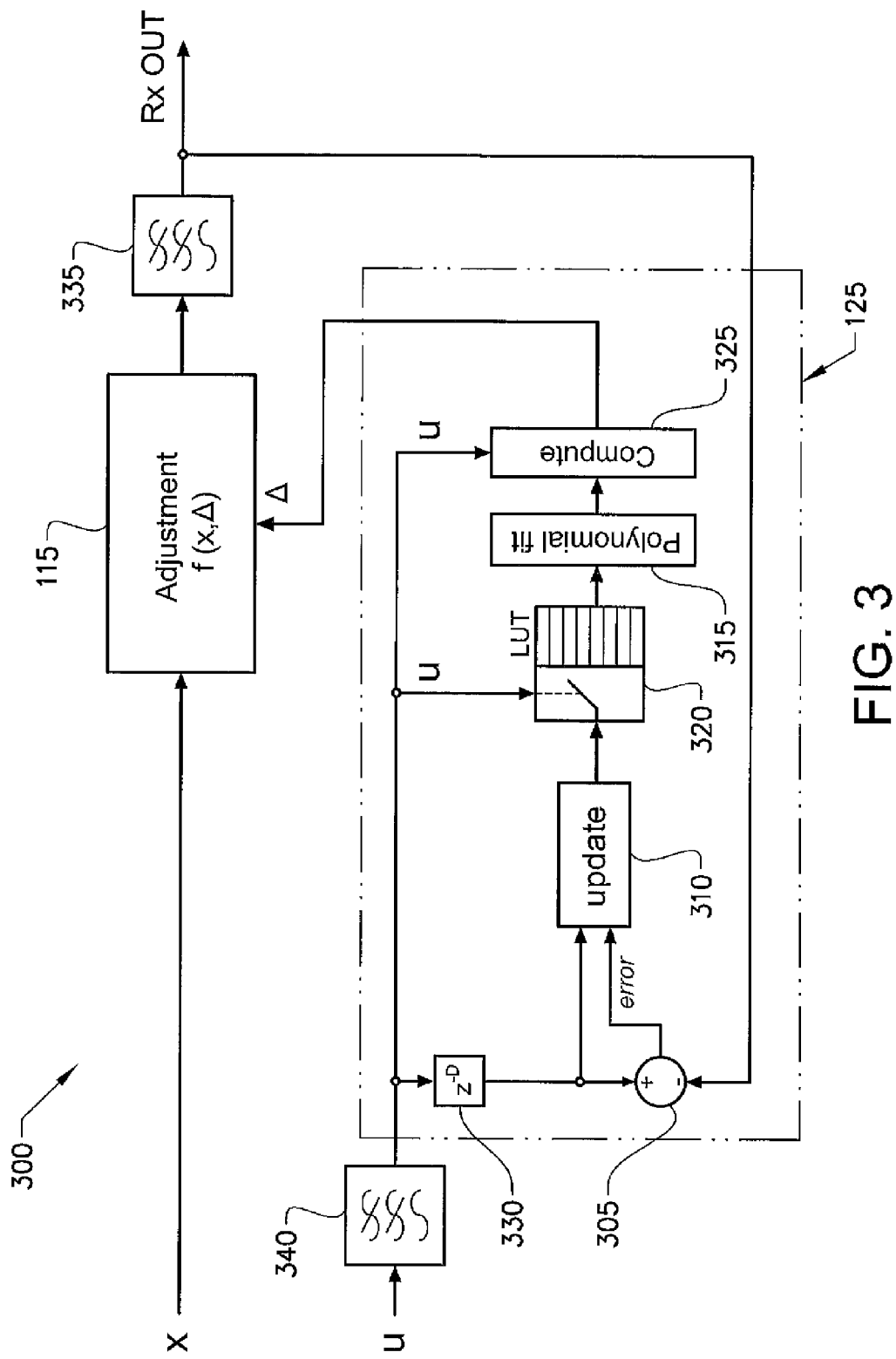
FIGS. 3 and 4 show two different examples of embodiments of the receiver circuit.

A description of a more detailed embodiment 300 of a receiver circuit, with an example of a more detailed embodiment of the adjustment value 125 in particular will now be given with reference to FIG. 3. Reference numbers from FIG. 1 have been retained for corresponding components. In FIG. 3, the example of an embodiment of the adjustment circuit 125 is shown inside dashed lines.

As was also shown in FIG. 1, the output signal $Rx_{OUT}$ from the receiver circuit 300 is used as input to the adjustment value circuit 125. However, in the receiver circuit 300, the output signal from the adjustment circuit 115 is used as the output signal $Rx_{OUT}$ from the receiver circuit 300 after being passed through a low pass filter 335. As shown in FIG. 3, the adjustment circuit 125 also receives the demodulated output signals from the observation receiver 120, said signals being indicated as "u" in FIG. 3. As shown in FIG. 3, the signal "u" is also passed through a low pass filter 340 before being received in the adjustment value circuit 125. The demodulated output signals from the main receiver 110 are shown as "x" in FIG. 3.

In the embodiment of an adjustment circuit 125 shown in FIG. 3, there is comprised a difference forming circuit 305 which is arranged to receive the output signal $Rx_{OUT}$ and the filtered output signal "u" from the observation receiver 120, and to form a difference value between those two signals. The signal "u" is passed through a delay circuit 330 before being used in the difference forming circuit 305, with the delay of the delay circuit 330 being designed so that the values of "u" will be processed together with corresponding values of $Rx_{OUT}$, i.e. primarily to match delays in the adjustment circuit 115.

As shown in FIG. 3, the adjustment circuit 125 also comprises a Look Up Table 320 which comprises a number of "bins". In each bin, the LUT 320 stores a difference value which is weighted and which corresponds to values of u within a certain range. The weighted difference values in the bins of the LUT 320 are updated by an updating circuit 310, as indicated in FIG. 3. The current value of u is therefore, as indicated in FIG. 3, used as direct input to the LUT 320 in order to "direct" an updating value from the updating circuit 310 to the proper bin in the LUT 320. In this manner, the weighted difference values in the bins of the LUT 320 are updated by updating values from the updating circuit 310.

Regarding the weighted difference values which are stored in the bins of the LUT 320, they are updated by the updating circuit 310 in the following manner: The output from the difference forming circuit 305, i.e. the difference value between the signals "u" and $Rx_{OUT}$ is used as one of two input signals to the updating circuit 310, the other of the two input signals to the updating circuit 310 being the delayed signal "u". The updating circuit 310 uses the value of the delayed signal "u" in order to weight the difference value which is received from the circuit 305 in order to arrive at the updating value for a certain bin in the LUT 320.

The weighting which is performed by the updating circuit 310 can be performed in a number of various ways, but the principle is that a value of u with a large amplitude will cause a large weighting of the difference value from the difference forming circuit 305, and a value of u with a small amplitude will cause a lesser weighting of the difference value from the difference forming circuit 305. The weighted value which is arrived at in the updating circuit 310 is used to update the value in the corresponding bin in the LUT 320, where the proper bin is found as described above, i.e. by means of the value of u. The updating of a value in a bin in the LUT can be done by means of, for example, adding the updating value from the updating circuit to the value in the proper bin in the LUT. Naturally, the term "addition" here also comprises addition by negative values from the updating circuit 310, i.e. in practice subtraction.

As an alternative to updating a value in a bin in the LUT 320, the updating circuit can of course be arranged to determine a value which will replace the current value in the bin in the LUT 320. However, in one embodiment, the updating circuit determines a value which is used to update, i.e. adjust, for example by means of addition, a value in a bin in the LUT 320. A method which can be mentioned for suitable use in the updating circuit 310 in order to determine the updating values is the so called LMS-method, the Least Mean Square method.

The LUT 320 outputs the contents of its bins, i.e. the weighted difference values which correspond to values of u, to a polynomial fit circuit 315, which is arranged to find a polynomial curve which fits the weighted difference values from the LUT 320. In an embodiment in which the weighted difference values are added to the values in the bins in the LUT, this can also be seen as a filtering of the values in the LUT, such as, for example, moving average filtering. Now, let N be the number of bins in the LUT 320. The polynomial found by the polynomial fit circuit 315 can then be written as $\alpha_0 + \alpha_1 + \alpha_2 u^2 + \alpha_3 u^3 + \ldots \alpha_N u^N$, where $\alpha_0$ to $\alpha_N$ are coefficients which are determined by the polynomial fit circuit 315, and the task of the polynomial fit circuit 315 is to find the proper coefficients $\alpha_0$ to $\alpha_N$ by means of finding a polynomial curve which fits the N scaled difference values from the LUT 320.

Once the polynomial curve has been found, it is used as input to a computation circuit 325, which also receives the signal "u" as its input. The computation circuit 325 forms the values of "u" necessary in the polynomial, i.e. u, $u^2$, $u^3 \ldots u^N$, and uses these values together with the coefficients received from the polynomial fit circuit 315 in order to determine the value of the polynomial $\alpha_0 + \alpha_1 u + \alpha_2 u^2 + \alpha_3 u^3 + \ldots \alpha_N u^N$, shown as $\Delta$ in FIG. 3, and $\Delta$ is then used as input to the adjustment circuit 115, which uses the current value of the demodulated signal x from the main receiver together with the value of $\Delta$ in order to adjust the value of x, which is then passed through the low pass filter 335 and becomes $Rx_{OUT}$.

The adjustment circuit 115 can be arranged to use the value of $\Delta$ to correct the value x from the main receiver 110 in a number of ways within the scope of the invention, but two examples of adjustment methods which can be mentioned are addition and subtraction, i.e. [x±Δ]. An alternative is to correct the value x from the main receiver 110 using the following expression, where we use A(u) instead of $\Delta$ to denote the value of the polynomial formed in the adjustment value circuit 125:

$$x \pm \sum_{l=0}^{L} A_l(u(n-l))$$

In the expression above, L is the number of LUTs, i.e. there is more than one LUT used, with each LUT has a delay of l in the samples from the filters 335 and 340. In such an embodiment, L tables are obtained which are phase shifted relative to each other by a number of samples in the range of 1 to L. Such an embodiment can then handle values which would otherwise end up between sampling times.

Figure 4:
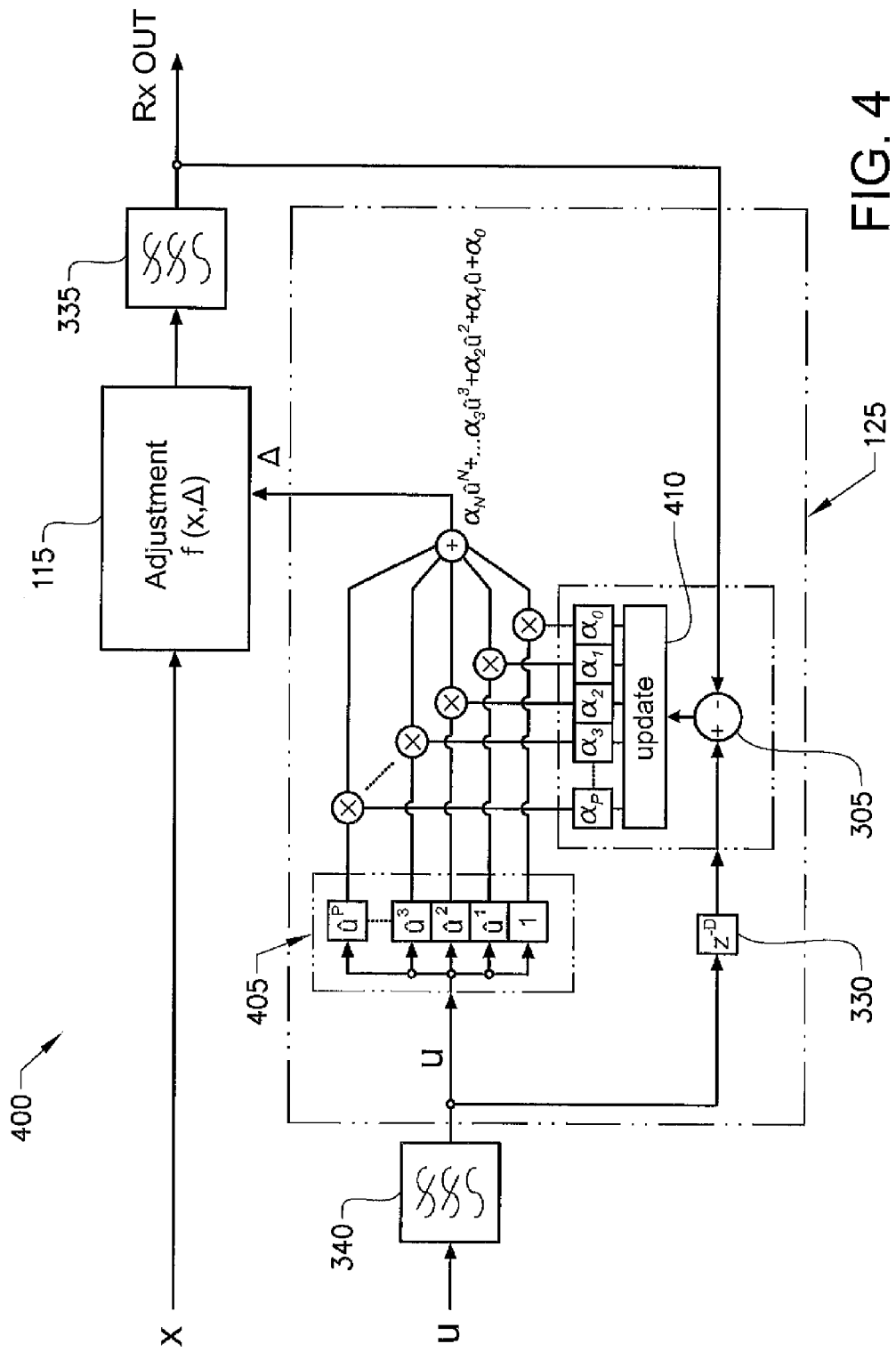

FIG. 4 shows a further embodiment of a receiver circuit of the invention, which uses another embodiment of the adjustment value circuit 125. As in FIG. 3, the embodiment of the adjustment value circuit 125 is shown within dashed lines. Like numbers from FIGS. 1 and 3 refer to like components such as, for example, the low pass filters 335 and 340. A difference between the embodiments of the adjustment value circuit 125 in FIG. 4 and that in FIG. 3 is that the embodiment in FIG. 4 determines the polynomial coefficients and the polynomial as such "on the fly", as opposed to using, for example, a LUT for storing weighted difference values.

As shown in FIG. 4, in the adjustment value circuit 125, the filtered (in the low pass filter 340) and demodulated output signal u from the observation receiver is received in a delay circuit 330, whose function has been explained in connection with FIG. 3 above. The filtered and delayed value of u and the value of $Rx_{OUT}$ are received in a circuit 305 for forming a difference between u and $Rx_{OUT}$, and this difference is then used in an updating circuit 410 to form the polynomial coefficients in a best fit polynomial, i.e. a polynomial which best fits the difference values between the values of u and $Rx_{OUT}$. The coefficients are shown as $\alpha_0$ to $\alpha_N$ in FIG. 4. Suitably but not necessarily, the updating circuit 410 is, in similarity to the updating circuit 310, arranged to use LMS methods.

The embodiment 125 of FIG. 4 also comprises an exponent forming unit 405, which receives the filtered but non-delayed value of u as its input signal, and which is arranged to form the exponential values of u needed in the polynomial which is to be formed, i.e. $u^0$, $u^1$, $u^2 \ldots u^N$.

In the embodiment of the adjustment value circuit 125 of FIG. 4, each value formed in the exponent forming unit 405 is arranged to be multiplied with the corresponding coefficient from the updating circuit 410, i.e. $u^0$ is arranged to be multiplied with $\alpha_0$, $u^1$ with $\alpha_1$, $u^2$ with $\alpha_2$, etcetera, so that a value is formed of a polynomial $\alpha_0 + \alpha_1 u + \alpha_2 u^2 + \alpha_3 u^3 + \ldots \alpha_N u^N$. The value of this polynomial, shown as $\Delta$ in FIG. 4, is used as input value to the adjustment circuit 115, together with the current value of x, i.e. the demodulated output signal from the main receiver. The adjustment circuit 115 then uses x and $\Delta$ in order to form a value f(x, $\Delta$) which is an adjusted and corrected value of the demodulated output signal from the main receiver, and the output value from the adjustment circuit 115 is used as output signal $Rx_{OUT}$ from the entire receiver circuit 400, after being passed through the low pass filter 335.

The updating circuit 410 can, in similarity to the updating circuit 310 in the embodiment 300 of FIG. 3, be arranged to function according to an LMS-method.

In certain embodiments of the receiver circuits 300 and 400 of FIGS. 3 and 4, respectively, the demodulated output values from the main and the observation receiver, i.e. the signals "x" and "u" using the notations of FIGS. 3 and 4, are complex, i.e. they comprise a real and an imaginary part, so that x=Re[x]+Im[x], and u=Re[u]+Im[u]. This is the case if, for example, so called I-Q modulation is used in the systems 300 and 400. In such cases, i.e. cases in which the demodulated output values from the main and the observation receiver are complex, the input values to, and output values from, the difference forming circuit 305, will be complex values, and the polynomials formed in both the embodiments 300 and 400 will be complex.

Figure 5:
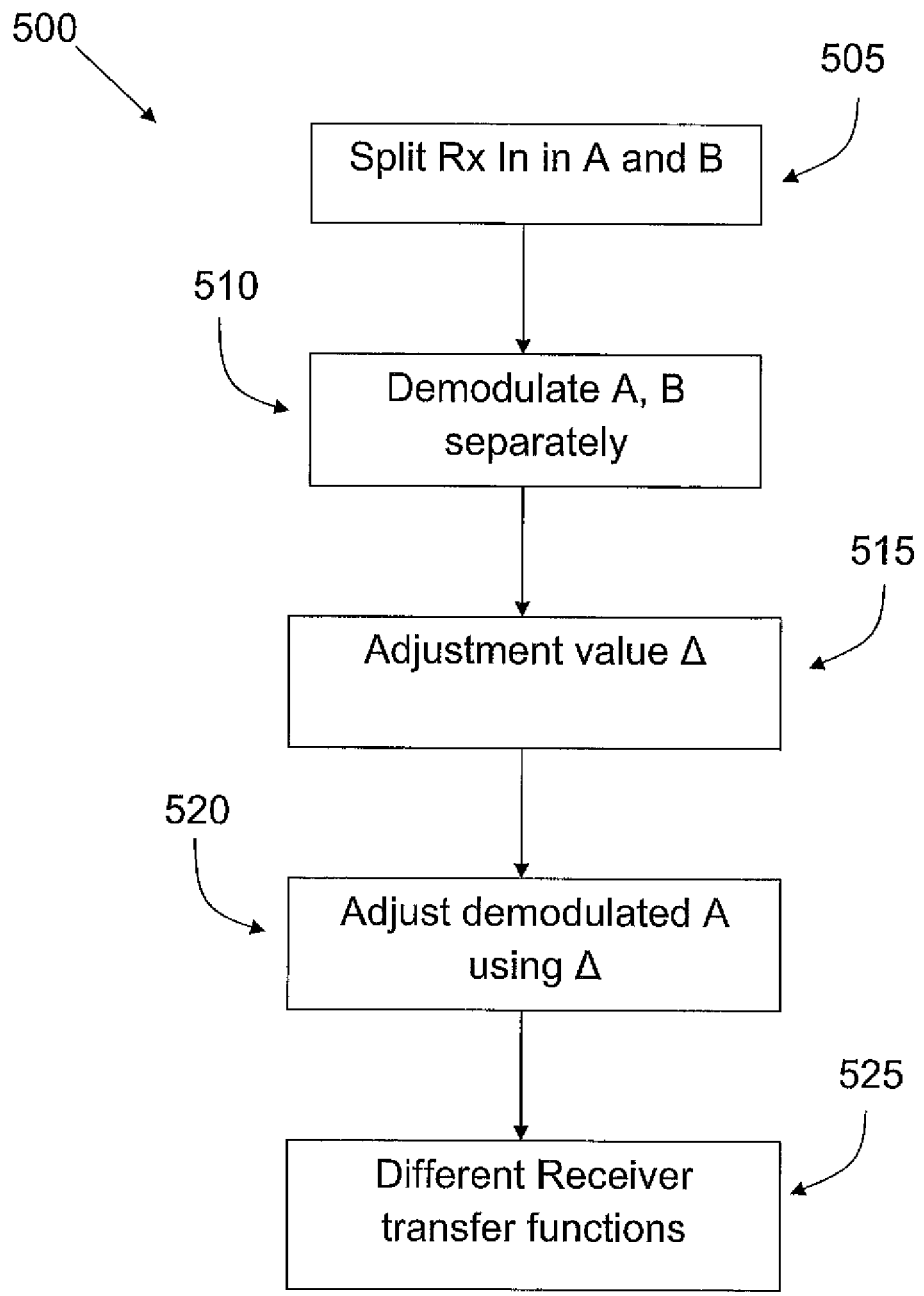
FIG. 5 shows a schematic flowchart of a method of the invention.

FIG. 5 shows a schematic flow chart of a method 500 of the invention. The method 500 is for use in a receiver circuit such as the ones 100, 300 and 400 shown in FIGS. 1, 3 and 4, and comprises, as shown in step 505, splitting a received signal into a first part A and a second part B part and demodulating, step 510, the first and second parts in separate first and second receivers.

In addition, the method 500 comprises adjusting, step 520, the demodulated first part and using the adjusted demodulated second part as the output signal from the receiver circuit. Furthermore, the method 500 comprises determining, step 515, an adjustment value Δ by means of forming a difference value between the output signal of the receiver circuit 100, 300, 400 and the demodulated first part. According to the method 500, as shown in step 525, the first and the second receiver are chosen to have different transfer functions within one and the same frequency range.

In embodiments of the method 500, the first 110 and the second receiver 120 are chosen so that the first receiver 110 has a linear transfer function in an interval from a first lower frequency to a first upper frequency and the second receiver has a linear transfer function in an interval from a second lower frequency to a second upper frequency. At least one of the first lower frequency and the first upper frequency is smaller or larger than the second lower frequency and the second upper frequency, respectively.

In embodiments of the method 500, the first and the second receiver are given different transfer functions within one and the same frequency range by choosing as the first receiver a super heterodyne receiver and the second receiver as a homodyne receiver.

In embodiments of the method 500, the adjustment value Δ comprises the value of a polynomial which is applied to the demodulated signal from the first receiver.

Embodiments of the invention are described with reference to the drawings, such as block diagrams and/or flowcharts. It is understood that several blocks of the block diagrams and/or flowchart illustrations, and combinations of blocks in the block diagrams and/or flowchart illustrations, can be implemented by computer program instructions. Such computer program instructions may be provided to a processor of a general purpose computer, a special purpose computer and/or other programmable data processing apparatus to produce a machine, such that the instructions, which execute via the processor of the computer and/or other programmable data processing apparatus, create means for implementing the functions/acts specified in the block diagrams and/or flowchart block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the block diagrams and/or flowchart block or blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions/acts specified in the block diagrams and/or flowchart block or blocks.

In some implementations, the functions or steps noted in the blocks may occur out of the order noted in the operational illustrations. For example, two blocks shown in succession may in fact be executed substantially concurrently or the blocks may sometimes be executed in the reverse order, depending upon the functionality/acts involved.

In the drawings and specification, there have been disclosed exemplary embodiments of the invention. However, many variations and modifications can be made to these embodiments without substantially departing from the principles of the present invention. Accordingly, although specific terms are employed, they are used in a generic and descriptive sense only and not for purposes of limitation.

The invention is not limited to the examples of embodiments described above and shown in the drawings, but may be freely varied within the scope of the appended claims.

The invention claimed is:

1. A receiver circuit comprising a first and a second receiver which are arranged to receive and demodulate a first and a second part, respectively, of a received signal, the receiver circuit also comprising an adjustment circuit for adjusting the demodulated output signal from the first receiver, the output signal from the adjustment circuit being used as an output signal from the receiver circuit, the receiver circuit also comprising an adjustment value circuit for determining an adjustment value (Δ) for use by the adjustment circuit in adjusting the output signal from the first receiver, the adjustment value circuit being arranged to receive as input signals the demodulated signal from the second receiver and the output signal from the adjustment circuit, and to use differences between these input signals for forming said adjustment value (Δ), wherein the first receiver and the second receiver have different transfer functions within one and the same frequency range.

2. The receiver circuit of claim 1, in which the first and second receivers have different transfer functions within one and the same frequency range in that the first receiver has a linear transfer function in an interval from a first lower frequency to a first upper frequency and the second receiver has a linear transfer function in an interval from a second lower frequency to a second upper frequency, where at least one of the first lower frequency and the first upper frequency is smaller or larger than the second lower frequency and the second upper frequency, respectively.

3. The receiver circuit of claim 1, in which the first and second receivers have different transfer functions within one and the same frequency range, wherein the first receiver is a super heterodyne receiver and the second receiver is a homodyne receiver.

4. The receiver circuit of claim 1, comprising a splitter for splitting a received signal into said first and second parts.

5. The receiver circuit claim 1, in which said adjustment value (Δ) comprises the value of a polynomial which the adjustment value circuit is arranged to determine and which the adjustment circuit is arranged to apply to the demodulated signal from the first receiver.

6. A method for use in a receiver circuit, the method comprising splitting a received signal into a first and a second part and demodulating the first and second parts in separate first and second receivers, the method comprising adjusting the demodulated first part and using the adjusted demodulated second part as the output signal from the receiver circuit, the method comprising determining an adjustment value (Δ) by forming a difference value between the output signal of the receiver circuit and the demodulated first part, wherein the first and second receiver are chosen to have different transfer functions within one and the same frequency range.

7. The method of claim 6, wherein the first and the second receiver are chosen so that the first receiver has a linear transfer function in an interval to a first upper frequency and the second receiver has a linear transfer function in an interval from a second lower frequency to a second upper frequency, where at least one of the first lower frequency and the first upper frequency is smaller or larger than the second lower frequency and the second upper frequency, respectively.

8. The method of claim 6, wherein the first and the second receiver are given different transfer functions within one and the same frequency range by choosing as the first receiver a super heterodyne receiver and as the second receiver a homodyne receiver.

9. The method of claim 6, wherein said adjustment value ($\Delta$) comprises the value of a polynomial which is applied to the demodulated signal from the first receiver.

* * * * *